United States Patent Office 3,422,159
Patented Jan. 14, 1969

3,422,159
FLUORINATION OF UNSATURATED COMPOUNDS
Bernard Sukornick, Morristown, and Christian A. Wamser, Berkeley Heights, N.J., assignors to Allied Chemical Corporation, New York, N.Y., a corporation of New York
No Drawing. Filed June 23, 1966, Ser. No. 559,725
U.S. Cl. 260—648          13 Claims
Int. Cl. C07c 17/02; C01b 35/00; C07c 17/04

ABSTRACT OF THE DISCLOSURE

Complexes of the formula $F_3NO \cdot X$; wherein X is $BF_3$, $AsF_5$ or $SbF_5$, are capable of fluorinating a vareity of aliphatic and aromatic compounds containing double bonds. Such fluorination reactions are characterized generally by the absence of significant cleavage or dissociation of the products as occurs in fluorination reactions using strong fluorinating agents.

---

This invention relates to the use of complexes of the formula $F_3NO \cdot X$; wherein X is $BF_3$, $AsF_5$ or $SbF_5$, as fluorinating agents.

The complex $F_3NO \cdot BF_3$ (a stable white solid at temperatures below about $-80°$ C.) and its utility in the purification of $F_3NO$, or as an intermediate in the preparation of high energy oxidizers, have been disclosed in co-pending, commonly assigned application of James S. MacKenzie and William B. Fox, Ser. No. 214,157, filed July 23, 1962 now U.S.P. 3,323,866. The complexes $F_3NO \cdot AsF_5$, (a stable white solid at temperatures below about room temperature) and $F_3NO \cdot SbF_5$ (a stable white solid at about room temperature) and similar utility are disclosed in copending, commonly assigned application of Fox et al., Ser. No. 559,743, filed June 23, 1966.

It has now been found that the above three described complexes, hereafter referred to as the $F_3NO \cdot X$ complexes, possess unusual and unique fluorinating properties in that they have the ability to fluorinate unsaturated double bonds in a variety of compounds containing the same to obtain useful fluorinated derivatives in unexpectedly high yields and with a minimum of carbon-carbon and carbon-hydrogen bond cleavage, as takes place in many other fluorination reactions. In most cases, symmetrical addition of two fluorine atoms across the double bond results and it is postulated that the reaction mechanism always follows this course; however, in some instances rearrangement takes place to form the unsymmetrical fluorinated derivatives. Other significant characteristics of the novel fluorination procedure are: it is simple and inexpensive to carry out; it may be carried out under low temperature conditions and at atmospheric pressure; and product recoveries are simple and efficient.

It is accordingly a major object of this invention to provide a novel means for fluorinating unsaturated double bonds in compounds containing the same, to obtain high yields of fluorinated derivatives without substantial accompanying cleavage or dissociation of the products.

It is another object of the invention to provide a means for fluorinating unsaturated double bonds in compounds containing the same which does not suffer from many of the disadvantages possessed by prior art procedures for fluorination of such materials.

Another object of the invention is to provide a novel means for fluorinating unsaturated double bonds in compounds containing the same to obtain high yields of fluorinated derivatives containing the same number of carbon atoms, which can be efficiently carried out at low temperatures and at atmospheric pressure.

Yet another object of the invention is to provide a novel fluorination procedure, as above described, in which products can be easily and efficiently recovered.

Other objects and advantages will become apparent from the following description.

The fluorination procedure of the invention is carried out by merely contacting a suitable starting material, containing one or more unsaturated double bonds, with one of the $F_3NO \cdot X$ complexes at a reactive temperature. The $F_3NO \cdot X$ complex may be performed and then contacted with the material to be fluorinated, or it may be formed in situ in the fluorination reaction by bringing into contact $F_3NO$, the X component and the unsaturated starting material, in any order, under reactive conditions.

Preparation of preformed $F_3NO \cdot X$ complexes may be accomplished by condensing $F_3NO$ and the desired X component, by means of a vacuum manifold, into a reaction vessel which is provided with external cooling means, such as a liquid nitrogen trap. The reaction vessel should be warmed up and then cooled back down several times in order to get maximum conversions. Synthesis of the $F_3NO \cdot BF_3$ complex is discussed more in detail in co-pending application of James S. MacKenzie and William B. Fox, Ser. No. 214,157, mentioned supra. A more detailed description for the preparation of the $F_3NO \cdot AsF_5$ and $F_3NO \cdot SbF_5$ complexes may be found in co-pending application of Fox et al., Ser. No. 559,743 noted supra.

It has been found that best results are obtained when the $F_3NO \cdot X$ complex is formed in situ and, when such a technique is employed, it is necessary to first mix the $F_3NO$ and unsaturated starting material and then add the X component; since, if the $F_3NO$ and X components are brought together before the unsaturated starting material is added, they will combine immediately and provide what amounts to preformed $F_3NO \cdot X$ complex. The fluorination reaction will readily proceed when at least one of the reactants present is either in gas or liquid phase. Due to the extremely low vapor pressure of $SbF_5$ at its melting point (7° C.), however, gas phase reactions with this material are most inconvenient and are therefore not feasible.

Although not absolutely necessary, a solvent may be employed to facilitate contact between the reactants. Criteria for such a solvent are that it should, of course, be a reasonably good solvent for the reactants concerned and that it should also be inert to reactants and the products of reaction. Illustrative suitable solvents which may be employed include such materials as HF, $AsF_3$, $IF_5$ and $BrF_5$.

The fluorination reaction may be carried out over a wide range of temperatures, even down to about the temperature of liquid nitrogen ($-196°$ C.) and up to about 40° C. or above. As pointed out heretofore, one of the advantages of these fluorinating agents is that effective fluorination can be carried out at low temperatures thus avoiding conditions under which cleavage and dissociation of products is apt to take place. Room temperature is generally suitable and is most convenient. Preferred temperature ranges, however, will depend upon the particular $F_3NO \cdot X$ complex being employed. In the case of $F_3NO \cdot AsF_5$, the preferred temperature range is between about 0° C. and room temperature. Reaction rates with $F_3NO \cdot BF_3$ at room temperature and above are unduly slow and the preferred operating range for this reagent is between about $-50$ and $-78°$ C. The preferred operating temperature range with $F_3NO \cdot SbF_5$ is from about $-78°$ C. up to about room temperature.

The fluorination reaction may be conveniently and effectively carried out at atmospheric pressure. Sub- or superatmospheric pressures may be employed, however.

A 1:1 molar ratio of $F_3NO \cdot X$ complex to unsaturated starting material is required to complete the fluorination for each unsaturated double bond which is involved. Where the $F_3NO \cdot X$ reagent is formed in situ, the stoichiometric ratio of $F_3NO$ to the X component to unsaturated starting materials containing a single unsaturated double bond is 1:1:1. An excess of any one of the reactants will not deleteriously affect the reaction. If more than one unsaturated double bond in the same molecule is sought to be fluorinated, additional equivalent amounts of fluorinating agent are required accordingly. Fluorination will normally proceed progressively, i.e., if one double bond in a compound is more reactive than another, it will react first, and so on, successively.

Apparatus suitable for practice of the invention is any conventional apparatus adapted to facilitate handling and contacting of gaseous reactants and includes the conventional vacuum manifold, provided with a standard vacuum pump and valved outlets to reactant and reaction vessels, which may in turn be provided with external cooling means, such as a Dry-Ice or liquid nitrogen trap. More detailed description of particular apparatus suited for use in accordance with the invention is provided in the appended examples.

Reaction times will vary considerably, depending on such factors as the particular $F_3NO \cdot X$ complex and unsaturated starting material employed and the reaction temperature; but usually can be controlled by regulating conditions so as to effect reaction virtually instantaneously.

A wide variety of compounds containing one or more unsaturated double bonds may be fluorinated with the $F_3NO \cdot X$ complexes. Such compounds may be of an aliphatic, cycloaliphatic or aromatic nature or have mixed aliphatic and aromatic moieties. The starting materials may be mono- or polyunsaturated double bond compounds and the double bonds may be associated in conjugated form in aliphatic or in aromatic structures or the double bonds may be non-conjugated. The starting materials may also have a variety of functional groups which are unreactive to the $F_3NO \cdot X$ fluorinating agents. Illustrative of such functional groups are the following: halogen, $NO_2$, $COOH$, $SO_2$, $SO_3H$ and $PO_4$. Other nonreactive functional groups will readily occur to those skilled in the art and still others may be ascertained by routine testing. Preferred classes of unsaturated starting materials include unsubstituted olefins, such as ethylene, isopropylene and n-hexylene; halogenated olefins, such as tetrafluoroethylene, chlorotrifluoroethylene and trifluoroethylene; vinyl and allyl compounds, such as vinyl chloride and allyl chloride; cycloaliphatic mono- or polyolefins, such as perfluorocyclohexene and perfluorocyclohexa-1,4-diene; and polyhalogenated aromatic compounds containing at least four chlorine and/or fluorine atoms, such as hexafluorobenzene.

The X components of the novel fluorinating agents, i.e., $BF_3$, $AsF_5$ and $SbF_5$, are all commercially available. $BF_3$ has a melting point of about $-127°$ C., a boiling point of about $-101°$ C. at atmospheric pressure and is a colorless gas at standard conditions. $AsF_5$ has a melting point of about $-79.8°$ C., a boiling point of about $-53.2°$ C. and is also a colorless gas at standard conditions. $SbF_5$ has a melting point of about $7°$ C., a boiling point of about $149.5°$ C. at atmospheric pressure and is a colorless, somewhat viscous liquid at standard conditions.

$F_3NO$ (trifluoramine oxide) has a melting point of about $-161°$ C., a boiling point of about $-89°$ C. at atmospheric pressure and is a colorless gas at standard conditions. It may be prepared by reacting $OF_2$ and $NF_3$, at temperatures in the range of about $-160$ to $-196°$ C. and at pressures in the range of about 0–150 mm. of Hg, while under the influence of an electrical discharge. A more detailed description of the preparation of this compound may be found in the co-pending application of James S. MacKenzie and William B. Fox, Ser. No. 214,157, mentioned supra.

The following illustrate practice of the invention with preformed $F_3NO \cdot X$ complexes without the use of an added solvent:

Examples 1–6

Quantities of $F_3NO \cdot BF_3$ and $F_3NO \cdot AsF_5$ complexes were preformed in glass bulbs of 30–120 cc. volume. These reaction vessels were connected to a standard vacuum manifold, evacuated and cooled to liquid nitrogen temperature ($-196°$ C.). Equimolar quantities of $F_3NO$ and $BF_3$ were condensed successively into some of the bulbs, using standard vacuum line procedures. Other bulbs were charged with equimolar quantities of $F_3NO$ and $AsF_5$. The bulb contents were warmed to $-78°$ C. to form the $F_3NO \cdot BF_3$ complex, or to $-40°$ C. to form the $F_3NO \cdot AsF_5$ complex. The product mixtures were maintained at the indicated temperatures for about 15 minutes, were recooled to $-196°$ C. and reheated and recooled several times to obtain maximum conversions to the respective complexes. The $F_3NO \cdot BF_3$ and $$F_3NO \cdot AsF_5$$

complexes were white solids at $-78°$ C. and $-40°$ C., respectively.

Preformed $F_3NO \cdot SbF_5$ complex was prepared by a similar procedure except that liquid $SbF_5$ was introduced into a Monel bulb, the bulb was cooled to $-196°$ C. and evacuated. Slightly more than one equivalent of $F_3NO$ was condensed into the bulb which was then sealed and warmed to room temperature. The temperature was maintained at this level until the pressure inside the bulb corresponded to less than 10% of the original $F_3NO$ charged, thus indicating that the reaction was substantially complete.

Next, equivalent weights of selected unsaturated reactants were condensed into the vessels containing the preformed complexes at a temperature of $-196°$ C. The resulting mixtures were allowed to warm up slowly (about 20 hours) to room temperature and the compositions of the resulting product mixtures were determined by infrared analyses. The results of the reactions run in this manner are indicated below in Table I.

TABLE I

| Example | Fluorinating Agent | Unsaturated Reactant | Product(s) and Yields Obtained |
|---|---|---|---|
| 1 | $F_3NO \cdot AsF_5$ | $CF_2=CFCl$ | $C_2F_5Cl$ (80%). |
| 2 | $F_3NO \cdot AsF_5$ | $CF_2=CFH$ | $C_2F_5H$ (95%). |
| 3 | $F_3NO \cdot AsF_5$ | $CF_2=CF_2$ | $C_2F_6$ (95%). $C_2F_5ONF_2$ (2%). |
| 4 | $F_3NO \cdot BF_3$ | $CF_2=CF_2$ | $C_2F_6$ (35%). $C_2F_5ONF_2$ (63%). |
| 5 | $F_3NO \cdot SbF_5$ | $CF_2=CFCl$ | $C_2F_5Cl$ (60%). $COF_2$ (10%). $CF_3Cl$ (10%); $CF_3COF$ (5%). |
| 6 | $F_3NO \cdot SbF_5$ | $CF_2=CFCl$ | $C_2F_5Cl$ (60%). $COF_2$ (10%). $CF_3COF$ (5%). $CF_3Cl$ (10%). |

The following illustrate practice of the invention with preformed $F_3NO \cdot X$ complexes employing an added solvent:

Examples 7–11

Solvents employed were $AsF_3$ and liquid anhydrous HF. Reaction vessels were of polychlorotrifluoroethylene. Solutions of $F_3NO \cdot X$ complexes in anhydrous HF or $AsF_3$ were prepared by condensing equimolar quantities of $F_3NO$ and the X components into the reaction vessels via all-metal vacuum manifolds, at $-196°$ C. The mixtures were then alternately warmed and cooled as described in Examples 1–6. Anhydrous HF or $AsF_3$ were then condensed onto the complexes at $-196°$ C. in amounts sufficient to make homogeneous solutions and, in the case of HF solutions of $F_3NO \cdot BF_3$, the mixtures were warmed to $-78°$ C.; in the case of $AsF_3$ solutions of $F_3NO \cdot AsF_5$ or of $F_3NO \cdot SbF_5$, the mixtures were warmed to 0° C. When the mixtures became homogeneous solutions, they were cooled to —196° C. and equivalent weights of selected unsaturated reactants were condensed into the reaction vessels. The reaction vessels were then sealed and the reaction mixtures warmed slowly (over a period of about 1–1½ hours) to —78° C., in the case of HF solutions of $F_3NO \cdot BF_3$, or to 0° C. in the case of $AsF_3$ solutions of $F_3NO \cdot AsF_5$ or of $$F_3NO \cdot SbF_5$$

Compositions of the resulting product mixtures were then determined by NMR and infrared analyses. The results of the reactions run in this manner are indicated below in Table II.

TABLE II

| Example | $F_3NO$ Reactant | Unsaturated Reactant | Solvent | Product(s) and Yields Obtained |
|---|---|---|---|---|
| 7 | $F_3NO \cdot AsF_5$ | $CF_2=CF_2$ | $AsF_3$ | $C_2F_6$ (90%). |
| 8 | $F_3NO \cdot AsF_5$ | $CF_2=CFCl$ | $AsF_3$ | $C_2F_5Cl$ (90%). |
| 9 | $F_3NO \cdot BF_3$ | $CF_2=CF_2$ | HF | $C_2F_6$ (55%). $C_2F_5ONF_2$ (40%). |
| 10 | $F_3NO \cdot SbF_5$ | $CF_2=CF_2$ | $AsF_3$ | $C_2F_6$ (70%). |
| 11 | $F_3NO \cdot BF_3$ | $CH_2=CH_2$ | HF | $CH_3CHF_2$ (50%). | the number of moles of unsaturated reactants admitted was equal to the number of moles of $F_3NO$ reactant already present. Either $AsF_3$ or $BF_3$ reactant was then introduced into the manifold at a pressure previously determined by calibration, so that when the reaction vessel was opened to the manifold, the $AsF_5$ or $BF_3$ component was introduced to the pressure increment which indicated that equimolar amounts of these materials were introduced to the systems. The compositions of the product mixtures were determined by infrared and NMR analyses. The results of the reactions run in this manner are indicated below in Table III.

TABLE III

| Example | X Component | Unsaturated Reactant | Time (hrs.) | Product(s) and Yields Obtained |
|---|---|---|---|---|
| 12 | $AsF_5$ | $CF_2=CF_2$ | I* | $C_2F_6$ (67%). $C_2F_5ONF_2$ (30%). |
| 13 | $AsF_5$ | $CF_2=CFCl$ | I | $C_2F_5Cl$ (90%). $CF_2ClCF_2ONF_2$ (5%). |
| 14 | $AsF_5$ | $CF_2=CFBr$ | I | $C_2F_5Br$ (90%). $CF_2BrCF_2ONF_2$ (1%). |
| 15 | $AsF_5$ | $CF_2=CFH$ | I | $C_2F_5H$ (93%). |
| 16 | $AsF_5$ | $CH_2=CH_2$ | I | $CH_3CHF_2$ (80%). |
| 17 | $AsF_5$ | perfluorocyclobutadiene | I | perfluorocyclobutene (70%). |
| 18 | $AsF_5$ | perfluorocyclobutene | I | perfluorocyclobutane (100%). |
| 19 | $BF_3$ | $CF_2=CF_2$ | 170 | $C_2F_6$ (30%). $CF_3CF_2ONF_2$ (18%). |
| 20 | $BF_3$ | $CH_2=CH_2$ | 65 | $CH_3CHF_2$ (35%). |

I*=Essentially immediate formation of the product.

$SbF_5$ component was not employed in the operational technique employed for Examples 12–20 due to its low vapor pressure and consequent non-feasibility of handling this material in vapor phase.

As will be seen from Examples 19 and 20, use of $BF_3$ component in the indicated procedure at room temperature resulted in very low reaction rates. As further will be seen from following Examples 21 and 22, reported in following Table IV, reaction rates with $BF_3$ component were substantially increased by operating at lower temperatures.

TABLE IV

| Example | X Component | Unsaturated Reactant | Temp. | Time | Product(s) and Yields Obtained |
|---|---|---|---|---|---|
| 21 | $BF_3$ | $CF_2=CF_2$ | —60° C | 50 | $C_2F_6$ (24%). $C_2F_5ONF_2$ (74%). |
| 22 | $BF_3$ | $CF_2=CFH$ | —78° C | 50 | $C_2F_5H$ (95%). |

The following illustrate practice of the invention when fluorination is carried out with the $F_3NO \cdot X$ complexes being formed in situ by successively introducing $F_3NO$, the X component and the unsaturated reactant into reaction vessels:

Examples 12–20

$F_3NO$ was introduced, at room temperature, into reaction vessels provided with vacuum stopcocks and connected to standard vacuum manifolds with conventional taper joints. The reaction vessels were glass or metal bulbs and were calibrated so that, after evacuation, gases could be introduced successively at known pressure increments in order that the molar quantities of gases introduced could be ascertained. The bulbs were then sealed and selected unsaturated starting materials were introduced into the vacuum manifold at such a pressure that when the reaction vessels were opened to the manifolds, Generally, fluorinations carried out by successively adding $F_3NO$, unsaturated reactant and $AsF_5$ at room temperature were the simplest to perform and gave the highest yields of fluorinated products in the shortest periods of time.

As it will be apparent that modifications and deviations may be made from the above description without departing from the spirit of the invention, the invention is to be limited only by the scope of the appended claims.

We claim:

1. The method for fluorinating double bonds in compounds containing the same which comprises reacting a complex of the formula:

$$F_3NO \cdot X$$

wherein X is $AsF_5$ or $SbF_5$ with a member selected from the group consisting of unsubstituted olefins, olefins substituted with one or more functional groups which are unreactive to the F₃NO·X complex, aromatically unsaturated carbocyclic compounds containing a combination of chlorine and fluorine atoms totaling at least four, and aromatically unsaturated carbocyclic compounds containing a combination of chlorine and fluorine atoms totaling at least four and additionally substituted with functional groups which are unreactive to the F₃NO·X complex.

2. The method according to claim 1 in which the fluorination is carried out by preforming the F₃NO·X complex and reacting the preformed complex with the double bond containing compound.

3. The method according to claim 1 in which the fluorination is carried out by preforming the F₃NO·X complex and reacting the preformed complex and the double bond containing compound in the presence of an inert solvent.

4. The method according to claim 1 in which the fluorination is carried out by reacting a mixture containing the double bond containing compound, F₃NO and a member selected from the group consisting of SbF₅ and AsF₅.

5. The method according to claim 1 in which the fluorination is carried out by first combining the double bond containing compound with F₃NO and then reacting this mixture with a member selected from the group consisting of SbF₅ and AsF₅.

6. The method according to claim 5 in which the mixture of the unsaturated compound and F₃NO is reacted with AsF₅.

7. The method according to claim 6 which is carried out at about room temperature.

8. The method of claim 1 in which the functional groups which may be substituted on the olefins or aromatically unsaturated carbocyclic compounds may be a member selected from the group consisting of halogen, NO₂, COOH, SO₂, SO₃H and PO₄, or mixtures thereof.

9. The method of claim 1 in which the F₃NO·X complex is reacted with an unsubstituted olefin.

10. The method of claim 1 in which the F₃NO·X complex is reacted with an olefin substituted with one or more halogen atoms.

11. The method of claim 1 in which the F₃NO·X complex is reacted with hexafluorobenzene.

12. The method of claim 1 in which the F₃NO·X complex is reacted with a compound selected from the group consisting of CF₂=CF₂, CF₂=CFCl, CH₂=CH₂, CF₂=CFBr, CF₂=CFH and

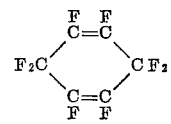

13. The method for fluorinating double bonds in compounds containing the same which comprises combining a double bond containing compound selected from the group consisting of a non-substituted olefin and a halogenated olefin with F₃NO at about room temperature, followed by reacting the F₃NO/double bond containing compound mixture with AsF₅, at about room temperature.

References Cited

UNITED STATES PATENTS 3,346,652  10/1967  Pilipovich _____ 260—653
3,062,902  11/1962  Anello et al. _____ 260—653.3

DANIEL D. HORWITZ, *Primary Examiner.*

U.S. Cl. X.R.

23—203; 260—346, 350, 502.4, 505, 513, 515, 539, 544, 607, 644, 646, 653